United States Patent [19]
Nichols et al.

[11] Patent Number: 5,508,331
[45] Date of Patent: * Apr. 16, 1996

[54] METAL OVERBASED AND GELLED NATURAL OILS

[75] Inventors: Willis P. Nichols, Cleveland; Calvin W. Schroeck, Willoughby Hills; Daniel E. Barrer, Richmond Heights; Robert E. Quinn, Cleveland, all of Ohio

[73] Assignee: The Lubrizol Corporation, Wickliffe, Ohio

[ * ] Notice: The portion of the term of this patent subsequent to Apr. 5, 2011, has been disclaimed.

[21] Appl. No.: 223,941

[22] Filed: Apr. 5, 1994

Related U.S. Application Data

[63] Continuation-in-part of Ser. No. 847,767, Mar. 5, 1992, Pat. No. 5,300,242.

[51] Int. Cl.$^6$ .................................................. C08J 3/09
[52] U.S. Cl. ........................ 524/313; 524/394; 524/400; 524/569; 524/567; 252/38; 252/39; 252/40; 252/41
[58] Field of Search ........................... 252/38, 39, 40, 252/41; 524/394, 400, 313, 569, 567

[56] References Cited

U.S. PATENT DOCUMENTS

| | | | |
|---|---|---|---|
| 2,417,428 | 3/1947 | McLennan | 252/39 |
| 2,588,556 | 3/1952 | Moore et al. | 252/40 |
| 2,989,463 | 6/1961 | Mastin | 252/25 |
| 3,492,231 | 1/1970 | McMillen | 252/33 |
| 4,904,401 | 2/1990 | Ripple et al. | 252/51.5 A |
| 5,300,242 | 4/1994 | Nichols et al. | 252/40 |

*Primary Examiner*—Stephen Kalafut
*Assistant Examiner*—Alan D. Diamond
*Attorney, Agent, or Firm*—James L. Cordek; Frederick D. Hunter; Joseph P. Fischer

[57] ABSTRACT

A metal overbased composition is disclosed that comprises (A) at least one natural oil comprising an animal oil or vegetable oil comprising a triglyceride of the formula

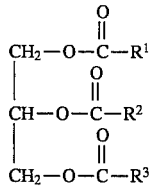

wherein $R^1$, $R^2$ and $R^3$ arc independently saturated or unsaturated aliphatic hydrocarbyl groups containing from about 8 to about 24 carbon atoms and (B) a metal base oxide (MO), hydroxide (MOH) or alkoxide ($R^4$OM) wherein the metal comprises an alkali or alkaline earth and $R^4$ is a hydrocarbyl group containing from about 1 to about 24 carbon atoms, and wherein the equivalent ratio of (A):(B) is from 0.90–10:1 to form a saponified intermediate, adding 2–11 equivalents of (B) per equivalent of formed saponified intermediate and reacting excess (B) with (C) an acidic gas comprising carbon dioxide, sulfur dioxide or sulfur trioxide.

This composition may also be gelled to produce a rheology control agent.

16 Claims, No Drawings

METAL OVERBASED AND GELLED NATURAL OILS

This is a continuation-in-part of application Ser. No. 07/847,767 filed on Mar. 5, 1992 now U.S. Pat. No. 5,300,242.

FIELD OF THE INVENTION

The present invention relates to a non-grease metal overbased composition as well as a method of preparation. This composition has utility as a PVC stabilizer for food grade packaging or as an additive for lubricants, and when gelled as a rheology control agent for paints, inks and greases.

BACKGROUND OF THE INVENTION

The normal processing of PVC requires the use of heat stabilizers. These stabilizers are generally added to the PVC as barium, cadmium, calcium and/or zinc salts and an appropriate carrier.

With a desire to use PVC packaging in food applications, it becomes a requirement that the additives in the PVC that come in contact with food be of an FDA compliant substrate.

The driving force of this invention is to form a composition having utility as a PVC stabilizer. The novelty of this composition is that a naturally occurring oil is the starting material. Additionally, the composition may be subjected to gellation to produce a rheology control agent.

U.S. Pat. No. 3,147,232 (Norman et al, Sep. 1, 1964) relates to plastic compositions which have an enhanced stability with respect to heat and light. In a more particular sense, this reference relates to compositions containing relatively large amounts of alkaline earth metals which are capable of imparting to plastic compositions the above-mentioned stability.

The oil soluble composition of this reference, which contains large amounts of alkaline earth metal is prepared by reacting a mixture of (A) an alcohol, (B) an aliphatic monocarboxylic acid, and (C) more than one equivalent of a basic alkaline earth metal compound per the equivalent of said acid compound, and treating said mixture with an acidic gas to reduce the viscosity thereof.

U.S. Pat. No. 3,242,079 (McMillen, Mar. 22, 1966) relates to thickened mineral oil compositions and to a process for preparing the same. In a more particular sense, it relates to homogenous grease compositions characterized by a high base basicity. The composition is prepared by mixing a fluid mineral oil solution containing from about 10% to about 70% of a carbonated, basic alkaline earth metal salt of an acid having at least about 12 aliphatic carbon atoms selected from the class consisting of sulfonic acids and carboxylic acids, said salt having a metal ratio of at least 4.5, and from about 1% to about 80%, based on said metal salt, of an active hydrogen compound selected from the class consisting of lower aliphatic carboxylic acids, water and water alcohol mixtures at temperatures between about 25° C. and the reflux temperature.

U.S. Pat. Nos. 3,384,586 (McMillen, May 21, 1968) and 3,492,231 (McMillen, Jan. 27, 1970) disclose resinous compositions containing a polymeric resin such as a polyolefin, polyamide, acrylic, polystyrene, polysulfide, polyether, polyester, melamine resin, alkyd resin and the like in combination with a non-Newtonian colloidal disperse system comprising (1) B solid metal-containing colloidal particles predispersed in (2) a dispersing medium and (3) as an essential third component at least one organic compound which is soluble in said dispersing medium, the molecules of said organic compound being characterized by a hydrophobic portion and at least one polar substituent.

U.S. Pat. No. 3,558,539 (Irish, Jan. 26, 1971) relates to a five component polyvinyl chloride stabilizer system utilizing metal salts of long chain monocarboxylic fatty acids, epoxidized organic material, tri-substituted organomonophosphite and tri-substituted organopolyphosphite. The resulting blends, when heat fused to produce articles such as containers display superior processing stability.

U.S. Pat. Nos. 4,436,855 (Higgins et al, Mar. 13, 1984) and 4,443,577 (Higgins et al, Apr. 17, 1984) disclose urethane coating compositions containing non-Newtonian colloidal disperse systems comprising (1) solid metal-containing colloidal particles predispersed in (2) a disperse medium of at least one inert organic liquid and (3) as an essential third component at least one member selected from the class consisting of organic compounds which are substantially soluble in said disperse medium, the molecules of said organic compound being characterized by polar substituents and hydrophobic portions. The former patent relates to two-component urethane coating systems which further comprise an organic polyfunctional isocyanate and an acidic ester of a phosphoric acid. The latter patent relates to one-component moisture curable urethane coating compositions which further comprises an isocyanate- terminated prepolymer.

SUMMARY OF THE INVENTION

The present invention relates to a non-grease composition comprising:

(A) At least one natural oil comprising a triglyceride of the formula

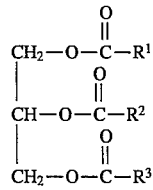

wherein $R^1$, $R^2$ and $R^3$ are hydrocarbyl groups independently containing from about 8 to about 24 carbon atoms and (B) a metal base comprising a metal oxide (MO), hydroxide (MOH) or alkoxide ($R^4$OM) wherein the metal M comprises an alkali or alkaline earth and $R^4$ is a hydrocarbyl group containing from about 1 to about 24 carbon atoms, and wherein the equivalent ratio of (A):(B) is from 0.90–10:1 to from a saponified intermediate, adding 2–11 excess equivalents of (B) per equivalent of formed saponified intermediate and reacting excess (B) with (C) an acidic gas comprising carbon dioxide, sulfur dioxide or sulfur trioxide with the proviso that said non-grease metal overbased composition does not contain mineral oil.

The composition, so formed by reacting components (A), (B) and (C) in a suitable carrier, is a "Newtonian" system (D) characterized by having a metal to acid equivalent ratio of greater than 1. From this "Newtonian" system can be prepared a non-Newtonian disperse system comprising compound (D) in a gelled state.

DETAILED DESCRIPTION OF THE INVENTION

The non-grease metal overbased composition, "Newtonian" system (D), of the present invention is prepared by reacting (A) a natural oil comprising a triglyceride with (B) a metal oxide (MO), hydroxide (MOH) or metal alkoxide ($R^4OM$) to form a saponified intermediate with (A) and reacting excess (B) or additional (B) with (C) an acidic gas in an appropriate organic carrier with the proviso that the organic carrier is not a mineral oil.

(A) The Natural Oil

In practicing this invention a natural oil is employed which is an animal or vegetable oil of a triglyceride of the formula

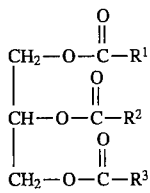

(I)

Within structure (I) $R^1$, $R^2$ and $R^3$ are hydrocarbyl groups independently containing from about 8 to about 24 carbon atoms. The term "hydrocarbyl group" as used herein denotes a radical having a carbon atom directly attached to the remainder of the molecule. Within the context of this invention, the hydrocarbyl group is of predominately aliphatic hydrocarbon character. Such aliphatic hydrocarbon groups include the following:

carbalkoxy (especially lower carbalkoxy) and alkoxy (especially lower alkoxy), the term, "lower" denoting groups containing not more than 7 carbon atoms.

(3) Hetero groups; that is, groups which, while having predominantly aliphatic hydrocarbon character within the context of this invention, contain atoms other than carbon present in a chain or ring otherwise composed of aliphatic carbon atoms. Suitable hetero atoms will be apparent to those skilled in the art and include, for example, oxygen and sulfur.

The hydrocarbyl groups may be saturated or unsaturated or a mixture of 7 both. The preferred triglycerides are those in which the aliphatic groups represented by $R^1$, $R^2$ and $R^3$ have from about 8 to about 24 carbon atoms. Typical triglycerides employed within the instant invention include coconut oil, safflower oil, sunflower oil, rapeseed oil, (both high erucic and low erucic) high oleic sunflower oil, cottonseed oil, peanut oil, corn oil, castor oil, lesquerella oil, soybean oil, palm oil, sesame oil, vernonia oil, as well as animal oils and fats having the prescribed structure formula (I), such as lard oil and beef tallow. It is preferred that the triglyceride be of a vegetable oil.

The naturally occurring triglycerides are not chemically pure. That is, while soybean oil satisfies a parameter of structure (I) wherein $R^1$, $R^2$ and $R^3$ contain from about 8 to 24 carbon atoms, soybean oil contains a mixture of fatty acids of different carbon lengths incorporated into a triglyceride structure. Table I outlines the composition of a few natural oils which are triglycerides.

TABLE I

| Name of Fatty Acid | Cottonseed Oil | Coconut Oil | Corn Oil | Castor Oil | Rapeseed Oil Low Erucic | Rapeseed Oil High Erucic | Soybean Oil | High Oleic Sunflower Oil | Tallow Oil | Olive Oil |
|---|---|---|---|---|---|---|---|---|---|---|
| Caproic | — | 0–1 | — | — | — | — | — | — | — | — |
| Caprylic | — | 5–10 | — | — | — | — | — | — | — | — |
| Capric | — | 5–10 | — | — | — | — | — | — | — | — |
| Lauric | 43–53 | 0–1 | — | — | — | — | — | — | — | — |
| Myristic | 0–2 | 15–21 | — | — | T | T | T | — | 1–6 | 0–1 |
| Palmitic | 17–29 | 7–11 | 8–19 | 2–3 | 3–6 | 0–5 | 7–12 | 3–4 | 20–37 | 7–16 |
| Stearic | 1–4 | 2–4 | 0–4 | 2–3 | 0–3 | 0–3 | 2–6 | 4–5 | 6–30 | 1–3 |
| Arachidic | 0–1 | — | — | — | 0–2 | 0–2 | 0–3 | 1 | T | 0–1 |
| Behenic | T | — | — | — | T | 0–2 | T | 1 | — | — |
| Lignoceric | T | — | — | — | T | T | — | — | — | — |
| Lauroleic | — | — | — | — | — | — | — | — | — | — |
| Myristoleic | — | — | — | — | — | — | — | — | — | — |
| Palmitoleic | 0–2 | — | — | — | T | T | T | — | 1–9 | — |
| Oleic | 13–44 | 6–8 | 19–50 | 4–9 | 50–66 | 9–25 | 20–30 | 80 | 20–50 | 65–85 |
| Gadoleic | T | — | — | — | 0–5 | 5–15 | 0–1 | — | — | — |
| Erucic | — | — | — | — | 0–5 | 30–60 | — | — | — | — |
| Ricinoleic | — | — | — | 80–87 | — | — | — | — | — | — |
| Linoleic | 33–58 | 1–3 | 34–62 | 2–7 | 18–30 | 11–25 | 48–58 | 9–10 | 0–5 | 4–15 |
| Linolenic | — | — | 0–2 | — | 6–14 | 5–12 | 4–10 | — | 0–3 | 0–1 |

(1) Aliphatic hydrocarbon groups; that is, alkyl groups such as heptyl, nonyl, undecyl, tridecyl, heptadecyl; alkenyl groups containing a single double bond such as heptenyl, nonenyl, undecenyl, tridecenyl, heptadecenyl, heneicosenyl; alkenyl groups containing 2 or 3 double bonds such as 8, 11-heptadienyl and 8, 11, 14-heptatrienyl. All isomers of these are included, but straight chain groups are preferred.

(2) Substituted aliphatic hydrocarbon groups; that is, groups containing non-hydrocarbon substituents which, in the context of this invention, do not alter the predominantly hydrocarbon character of the group. Those skilled in the art will be aware of suitable substituents; examples are hydroxy, Some of the preferred vegetable oils of this invention are cottonseed oil, soybean oil, coconut oil, corn oil, castor oil, rapeseed oil and high oleic sunflower oil obtained from sunflower (Helianthus sp.) available from SVO Enterprises, Eastlake, Ohio as Sunyl® high oleic sunflower oil and vernonia oil. Vernonia oil is preferred because it is a naturally occurring epoxidized oil.

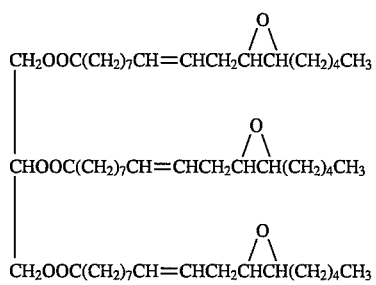

However, it is also within the scope of this invention to synthetically epoxidize any naturally occurring oil that is not naturally epoxidized. That is, a natural oil may be reacted with aqueous peracetic acid solution, or with hydrogen peroxide and acetic acid in a manner well known to those skilled in the art. The epoxide content of the synthetically epoxidized natural oils will vary with the degree of completion of the epoxidation reaction and also with the amount of unsaturation present in the triglyceride of the natural oil. Characteristically, such epoxidized oils have an oxirane oxygen content of at least 3%, preferably 5 to 15%. One example of an epoxidized natural oil is epoxidized soybean oil and one species present of the epoxidized soybean oil is

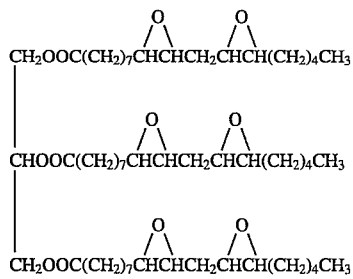

(B) The Metal Base Oxide (MO), Metal Hydroxide (MOH), or Metal Alkoxide ($R^4OM$)

Component (B) is a metal base comprising (MO), (MOH), or (ROM) wherein M is an alkali metal or alkaline earth metal. The alkaline metals comprise lithium, sodium, or potassium; preferred is sodium and the alkaline earth metals comprise calcium, or barium and the preferred alkaline earth metal is calcium. When ($R^4OM$) is employed, $R^4O$— is an alcohol residue with $R^4$ being a hydrocarbyl group containing from 1 to about 18 carbon atoms, preferably from 1 to about 10 carbon atoms and most preferably from 1 to about 4 carbon atoms. The hydrocarbyl group may be straight chained or branched chained.

When components (A) and (B) are reacted together, hydrolysis of the triglyceride occurs to form a saponified intermediate.

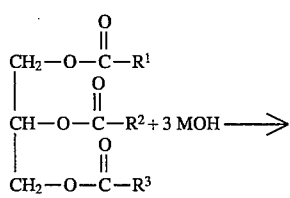

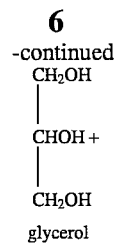

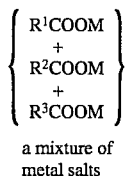

The above reaction is indicative of 100% saponification of the starting triglyceride. However, less than 100% saponification can occur which when overbased to a "Newtonian" system (D) gives a useful product.

When saponification is less than 100%, mono- substituted and disubstituted glycerides are obtained:

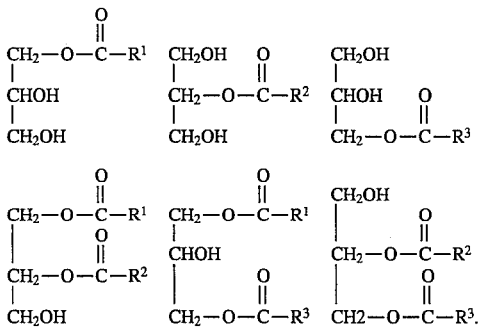

In forming the saponified intermediate, the triglyceride is reacted with component (B) in the presence of an alcohol or mixture of alcohols which act as promoters. The degree of saponification is a function of the amount of time the reactants are held at or near reflux.

Another factor affecting the degree of saponification is the amount of component (B) employed. If less than one equivalent of (A) is employed for one equivalent of (B), e.g., 0.90:1, 100% saponification could occur if proper temperature conditions exist. When more than one equivalent of (A) is used for one equivalent of (B), 100% saponification cannot be effected.

It is desirable for the degree of saponification to be at least 10%, i.e., an (A):(B) equivalent ratio of 10:1–10, preferably at least 50%, 2:1–2, and most preferably at least 75%, 1.33:1–1.33.

(C) The Acidic Gas

Acidic gases employed in this invention are sulfur dioxide, sulfur trioxide and carbon dioxide. Of these, carbon dioxide is preferred.

The amount of acidic gas which is used depends in some respects upon the desired basicity of the product in question and also upon the amount of component (B) employed.

After the saponified intermediate is obtained, additional component (B) is added and the acidic gas is blown below the surface to give an overbased product. Generally the additional equivalents of (B): saponified intermediated is from about 2–8:1 and preferably from about 3–7:1. Further, additional component (A) is added after the saponification and/or after the overbasing.

The terms "overbased", "superbased", and "hyperbased", are terms of art which are generic to well known classes of metal-containing materials. These overbased materials have also been referred to as "complexes", "metal complexes", "high-metal containing salts", and the like. Overbased materials are characterized by a metal content in excess of that which would be present according to the stoichiometry of the metal and the organic compound reacted with the metal, e.g., when a triglyceride is saponified with calcium hydroxide, one of the products formed is the mixture of metal salts $(R^1COO)_2Ca+(R^2 COO)_2Ca+(R_3COO)_2Ca$. This is considered to be the "normal" metal salt since it contains one equivalent of calcium for each equivalent of acid. However, as is well known in the art, various processes are available which result in an inert organic liquid solution of a product containing more than the stoichiometric amount of metal. The solutions of these products are referred to herein as overbased materials, the "Newtonian" system (D). Following these procedures, the "Newtonian" system (D) will contain an amount of metal in excess of that necessary to neutralize the acid, for example, 4.5 times as much metal as present in the normal salt or a metal excess of 3.5 equivalents. The actual stoichiometric excess of metal can vary considerably, for example, from about 1.05 equivalent to about 12 or more equivalents depending on the reactions, the process conditions, and the like. The overbased materials useful in preparing the disperse systems of the invention will generally contain from about 2.0 to about 12 or more equivalents of metal for each equivalent of material which is overbased.

The terminology "metal ratio" is used in the prior art and herein to designate the ratio of the total chemical equivalents of the metal in the overbased materials (e.g., a metal carboxylate) to the chemical equivalents of the metal in the product which would be expected to result in the reaction between the organic material to be overbased and the metal-containing reactant (e.g., calcium hydroxide, sodium oxide, etc.) according to the known chemical reactivity and stoichiometry of the two reactants. Thus, in the normal calcium carboxylate discussed above, the metal ratio is one, and in the overbased carboxylate, the metal ratio is 4.5. Obviously, if there is present in the material to be overbased more than one compound capable of reacting with the metal, such as a mixture of triglycerides, the "metal ratio" of the product will depend upon whether the number of equivalents of metal in the overbased product is compared to the number of equivalents expected to be present for a given single component or a combination of all such components.

When the saponified intermediate is obtained, glycerol is also formed. Free glycerol may also be added at the beginning of the saponification reaction as a promoter. Promoters are used in the overbasing process to aid in the incorporation of the large excess of metal. Besides glycerol, other promoters include such compounds as phenolic substances including phenol; alcohols such as methanol, 2-propanol, the butyl alcohols, the amyl alcohols, etc., as well as mixtures of alcohols; mono-glycerides, di-glycerides; amines such as aniline and dodecyl amine, etc. When the excess component (B) is reacted with component (C), the glycerol (free and formed) acts as both a diluent and contact agent and remains within the composition.

The following examples illustrate the preparation of the metal overbased natural oils, "Newtonian" system (D), of this invention. These examples are provided to teach those of ordinary skill in the art how to make and use the compositions of this invention. These illustrations are not to be interpreted as specific limitations as to the scope of what the inventors regard as their invention. Efforts have been made to ensure accuracy with respect to numbers used (e.g., amounts, temperature, etc.). Unless otherwise indicated, parts are parts by weight, temperature is in degrees Celsius and pressure, where so stated, is in millimeters of mercury.

EXAMPLE 1

Charged to a 3 liter 4-necked resin flask is 584 parts (2.0 equivalents) soybean oil, 600 parts Iso-Par G, a food grade mineral spirits available from Exxon Chemical, and 65 parts glycerin. The flask is fitted with a stainless steel banana blade stirrer, a stainless steel subsurface gas inlet robe, a stainless steel thermowell and a sidearm with a glass condenser. The contents are heated to 60° C. and 82.5 parts (2.2 equivalents) calcium hydroxide is added and the temperature is increased to reflux (about 155° C.). Reflux is maintained until a neutralization number is about 10 basic (about 2 hours). The batch is cooled to 60° C. and 100 parts isopropyl alcohol and 127 parts (3.4 equivalents) calcium hydroxide are added. Carbon dioxide is bubbled beneath the surface at 2 cubic feet per hour while maintaining the temperature at between 50°–60° C. until the neutralization number is between 7–12. The sequence is repeated 2 more times using 50 parts isopropyl alcohol and 127 parts (3.4 equivalents) calcium hydroxide while blowing with carbon dioxide at 2 cubic feet per hour to a neutralization number of between 7–12, except the last increment is blown to less than 5. The contents are stripped of water and alcohol by heating to 70° C. while blowing with nitrogen at 1 cubic foot per hour and later under a vacuum at 20 millimeters mercury. Analyses: % $CaSO_4$ ash 45.9 and total base number 380.

EXAMPLE 2

Charged to a 2 liter 4 necked flask equipped with a stirrer, thermowell, foam trap and water condenser are 460 parts (1.47 equivalents) Trisun 80, 39 parts (1.05 equivalents) calcium hydroxide, 33 parts glycerol and 500 parts xylene. The contents are heated to a reflux of 140° C. and held there for 2 hours. At the end of the reflux period, the neutralization number is zero signifying no unreacted calcium hydroxide. The contents are cooled to 60° C. and charged are 100 parts isopropyl alcohol and 74 parts (2.0 equivalents) calcium hydroxide. Carbon dioxide is blown below the surface at 1 cubic foot per hour until the neutralization number is 7 basic. The contents are stripped to 130° C. with a nitrogen sweep and later to 150° C. and 30 millimeters of mercury. During the vacuum stripping, as head space develops, 500 parts Trisun 80 is added as a diluent. The contents are cooled to 100° C. and filtered using 5% of the theory yield of a diatomaceous earth filmring aid to give the desired product having a total base number of 139 and a % $CaSO_4$ ash of 16.47.

EXAMPLE 3

Charged to a 2 liter 4 necked flask equipped as per Example 2 are 449 parts (1.4 equivalents) low erucic acid rapeseed oil, 37 parts (1.0 equivalent) calcium hydroxide, 33 parts glycerol and 500 parts Iso-Par G mineral spirits. The contents are heated to reflux of up to 162° C. and held for 3 hours. At the end of the reflux period the neutralization number is zero. At 60° C. charged are 100 parts isopropyl alcohol and the first increment of calcium hydroxide of 65 parts (1.76 equivalents). The contents are carbonated below the surface at 1 cubic foot per hour for 0.7 hours to a neutralization number of zero. Two additional 65 part increments of calcium hydroxide are added and each increment is carbonated at 1 cubic foot per hour for 0.7 hours to a neutralization number of zero. The contents are stripped to 150° C. with nitrogen blowing at 0.5 cubic feet per hour and filtered using 5 % filter aid. The obtained product has the following analyses: % CaSO$_4$ ash 37.1 and total base number 307.

EXAMPLE 4

Charged to a 2 liter 4 necked flask equipped as per Example 2 are 449 parts (1.4 equivalents) low erucic acid rapeseed oil, 37 parts (1.0 equivalent) calcium hydroxide, 33 parts glycerol and 400 parts Iso-Par G. The contents are heated to reflux of 168° C. and held at reflux for 8.5 hours to give a neutralization number of 6.6 basic. At room temperature is added 100 parts isopropyl alcohol and 86 parts (2.32 equivalents) calcium hydroxide. Carbon dioxide is blown below the surface at 1 cubic foot per hour for 1.2 hours to a neutralization number of 4.7 basic. The second and third 86 part increments are also carbonated to a less than 5 basic neutralization number. The contents are stripped and filtered to give a product with the following analyses: % CaSO$_4$ ash 38.6; total base number 324.

EXAMPLE 5

The procedure of Example 3 is repeated except that 436 parts (1.4 equivalents) castor oil replaces the rapeseed oil. Analyses: % CaSO$_4$ ash 54.5; total base number 451.

EXAMPLE 6

The procedure of Example 5 is repeated except that 500 parts xylene is also employed as a solvent during the overbasing. Analyses: % CaSO$_4$ ash 35.6; total base number 307.

EXAMPLE 7

Charged to a 3 liter 4 necked flask equipped as per Example 2 are 574 parts (2.0 equivalents) cottonseed oil, 50 parts glycerol, 400 parts Iso-Par G and 40 parts (1.0 equivalent) sodium hydroxide dissolved in 100 parts methyl alcohol. The contents are heated to remove the methyl alcohol and then heated to reflux of 140° C. and held for 3 hours. At 60° C. charged is 150 parts isopropyl alcohol and 60 parts (1.5 equivalents) sodium hydroxide and the $_2$ contents are blown with carbon dioxide at 1 cubic foot per hour until the neutralization number is below 5 basic. An additional 60 parts sodium hydroxide is charged with subsequent carbonation to a neutralization number of less than 5. The contents are stripped to 150° C. and 30 millimeters of mercury and filtered with 5% filter aid to give the desired 4.0 metal ratio composition.

EXAMPLE 8

Charged to a 5 liter 4-necked resin flask is 900 parts (3.1 equivalents) soybean oil, 1800 parts Iso-Par G, and 85 parts glycerin. The flask is fitted with a stainless steel banana blade stirrer, a stainless steel subsurface gas inlet tube, a stainless steel thermowell and a sidearm with a glass condenser. The contents are heated to 60° C. and 95 parts (2.57 equivalents) calcium hydroxide is added and the temperature is increased to reflux (about 155° C.). Reflux is maintained until the neutralization number is about 10 basic (about 2 hours). The batch is cooled to 60° C. and 98 parts isopropyl alcohol and 168 parts (4.54 equivalents) calcium hydroxide are added. Carbon dioxide is bubbled beneath the surface at 2 cubic feet per hour while maintaining the temperature at between 50°–60° C. until the neutralization number is between 7–12. The sequence is repeated 2 more times using 98 parts isopropyl alcohol and 168 parts (4.54 equivalents) calcium hydroxide while blowing with carbon dioxide at 2 cubic feet per hour to a neutralization number of between 7–12 basic, except the last increment is blown to less than 5 basic. Then added is 125 parts soybean oil and alcohol and water are stripped off by heating the contents to 120° C. At 50° C. the contents are clarified by dissolving in 3100 parts hexane and centrifuging the resultant solution at 1800 RPM for 1 hour. The liquid is decanted away from the solids and the liquid contents are then stripped to 130° C. at 20 millimeters mercury. Analyses: % CaSO$_4$ ash 41.5 and total base number 342.

In another embodiment, this invention is directed to the formation of a non-Newtonian colloidal dispersed system. The starting material for this embodiment is the component (D) above, a liquid dispersing medium and an organic compound which is soluble in said dispersing medium, the molecules of said organic compound being characterized by a hydrophobic portion and at least one polar substituent.

The terminology "disperse system" as used in the specification and claims is a term of art generic to colloids or colloidal solution, e.g., "any homogenous medium containing disperse entities of any size and state," Jirgensons and Straumanis, "A Short Textbook on Colloidal Chemistry" (2nd Ed.) The Macmillan Co., New York, 1962 at page 1. However, the particular disperse systems of the present invention form a subgenus within this broad class of disperse system, this subgenus being characterized by several important features.

This subgenus comprises those disperse systems wherein at least a portion of the particles dispersed therein are solid, metal-containing particles formed in situ. At least about 10% to about 50% are particles of this type and preferably, substantially all of said solid particles are formed in situ.

So long as the solid particles remain dispersed in the dispersing medium as colloidal particles the particle size is not critical. Ordinarily, the particles will not exceed about 5000 A. (The abbreviation "A" herein refers to angstroms.) However, it is preferred that the maximum unit particle size be less than about 1000 A. In a particularly preferred aspect of the invention, the unit particle size is less than about 400 A. Systems having a unit particle size in the range of about 50 A. to 300 A. give excellent results. The minimum unit particle size is generally at least about 20 A. and preferably at least about 30 A.

The language "unit particle size" is intended to designate the average particle size of the solid, metal-containing particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems. Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal containing particles". Obviously, the "particle size" of the agglomerate is substantially greater than the unit particle size. Furthermore, it is equally apparent that this agglomerate size is subject to wide variations, even within the same disperse system. The agglomerate size varies, for example, with the degree of shearing action employed in dispersing the unit particles. That is, mechanical agitation of the disperse system tends to break down the agglomerates into the individual components thereof and disperse the individual components through the disperse medium. The ultimate in dispersion is achieved when each solid, metal-containing particle is individually dispersed in the medium. Accordingly, the disperse systems are characterized with reference to the unit particle size, it being apparent to those skilled in the art that the unit particle size represents the average size of solid, metal-containing particles present in the system which can exist independently. The average particle size of the metal-containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the overbased material and conversion agent produces sufficient particle dispersion.

The non-Newtonian colloidal disperse systems used in the composition is of the present invention are prepared by homogenizing a conversion agent and the overbased "Newionian" system (D). Homogenization is achieved by vigorous agitation of the two components, preferably at the reflux temperature or slightly below the reflux temperature. The reflux temperature normally will depend upon the boiling point of the conversion agent. However, homogenization may be achieved at a temperature of about 25° C. or slightly higher. Usually, there is no real advantage in exceeding about 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% appear to afford no additional advantages.

The terminology "conversion agent" as used herein is intended to describe a class of very diverse materials which possess the property of being able to convert the "Newtonian" homogeneous, single-phase, overbased (D) into non-Newtonian colloidal disperse systems. The mechanism by which conversion is accomplished is not completely understood. However, with the exception of carbon dioxide, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, and carbon dioxide. Mixtures of two or more of these conversion agents are also useful. Particularly useful conversion agents are discussed below.

The lower aliphatic carboxylic acids are those containing less that about 8 carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloroacetic acid, trichloroacetic acid, etc. Formic acid, acetic acid, and propionic acid, are preferred with acetic acid being especially suitable. It is to be understood that the anhydrides of these acids are also useful and, for the purposes of the specification and claims of this invention, the term acid is intended to include both the acid per se and the anhydride of the acid.

Useful alcohols include aliphatic, cycloaliphatic, and arylaliphatic mono- and polyhydroxy alcohols. Alcohols having less than about 12 carbons are especially useful while the lower alkanols, i.e., alkanols having less than about 8 carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc.; cycloalkyl alcohols exemplified by cyclopentanol, cyclohexanol, 4-methylcyclohexanol, 2-cyclohexylethanol, cyclopentyl-methanol, etc.; phenyl aliphatic alkanols such as benzyl alcohol, 2-phenylethanol, and cinnamyl alcohol; alkylene glycols of up to about 6 carbon atoms and mono-lower alkyl ethers thereof such as monomethylether of ethylene glycol, diethylene glycol, ethylene glycol, trimethylene glycol, hexamethylene glycol, triethylene glycol, 1,4-butanediol, 1,4-cyclohexanediol, glycerol, and pentaerythritol.

The use of a mixture of water and one or more of the alcohols is especially effective for converting the overbased material to colloidal disperse systems. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is one or more lower alkanols are especially suitable.

Phenols suitable for use as conversion agents include phenol, naphthol, ortho-cresol, para-cresol, catechol, mixtures of cresol, para-tert-butylphenol, and other lower alkyl substituted phenols, metapolyisobutene (M.W. −350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclic amines are also useful providing they contain at least one amino group having at least one active hydrogen attached thereto. Illustrative of these amines are the mono- and di-alkylamines, particularly mono- and di-lower alkylamines, such as methyl- amine, ethylamine, propylamine, dodecylamine, methyl ethylamine, diethylamine; the cycloalkylamines such as cyclohexylamine, cyclopentylamine, and the lower alkyl substituted cycloalkylamines such as 3-methylcyclohexylamine; 1,4-cyclohexylenediamine; arylamines such as aniline, mono-, di- and tri-, lower alkyl-substituted phenyl amines, naphthylamines, 1,4-phenylene diamines; lower alkanol amines such as ethanolamine and diethanolamine; alkylenediamines such as ethylene diamine, triethylenetetramine, propylene diamines, octamethylene diamines; and heterocyclic amines such as piperazine, 4-aminoethylpiperazine, 2-octadecylimidazoline, and oxazolidine. Boron acids are also useful conversion agents and include boronic acids (e.g., alkyl-$B(OH)_2$ or aryl-$B(OH)_2$), boric acid (i.e., $H_3BO_3$), tetraboric acid, metaboric acid and esters of such boron acids.

The phosphorus acids are useful conversion agents and include the various alkyl and aryl phosphinic acids, phosphinous acids, phosphonic acids, and phosphonous acids. Phosphorus acids obtained by the reaction of lower alkanols or unsaturated hydrocarbons such as polyisobutenes with phosphorus oxides and phosphorus sulfides are particularly useful, e.g., $P_2O_5$ and $P_2S_5$.

Carbon dioxide can be used as the conversion agent. However, it is preferable to use this conversion agent in combination with one or more of the foregoing conversion agents. For example, the combination of water and carbon dioxide is particularly effective as a conversion agent for transforming the overbased materials into a colloidal disperse system.

As previously mentioned, the overbased materials (D) are single phase homogeneous systems. However, depending on the reaction conditions and the choice of reactants in preparing the overbased materials, there sometimes are present in the product insoluble contaminants. These contaminants are normally unreacted basic materials such as calcium oxide, sodium oxide, calcium hydroxide, sodium hydroxide, or other component (B) metal base materials. It has been found that a more uniform colloidal disperse system results if such contaminants are removed prior to gelling the overbased material (D) with the conversion agents. Accordingly, it is preferred that any insoluble contaminants in the overbased materials be removed prior to converting the material in the colloidal disperse system. The removal of such contaminants is easily accomplished by conventional techniques such as filtration or centrifugation. It should be understood, however, that the removal of these contaminants, while desirable for reasons just mentioned, is not an absolute essential aspect of the invention and useful products can be obtained when overbased materials containing insoluble contaminants are converted to the colloidal disperse systems.

The conversion agents or a portion thereof may be retained in the colloidal disperse system. The conversion agents are however, not essential components of these disperse systems and it is usually desirable that as little of the conversion agents as possible be retained in the disperse systems. Since these conversion agents do not react with the overbased material in such a manner as to be permanently bound thereto through some type of chemical bonding, it is normally a simple matter to remove a major portion of the conversion agents and, generally, substantially all of the conversion agents. Some of the conversion agents have physical properties which make them readily removable from the disperse systems. Thus, most of the free carbon dioxide gradually escapes from the disperse system during the homogenization process or upon standing thereafter. Since the liquid conversion agents are generally more volatile than the remaining components of the disperse system, they are readily removable by conventional stripping techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

Again, it is not essential that all of the conversion agent be removed from the disperse system. In fact, useful disperse systems for employment in the compositions of the invention result without removal of the conversion agents. However, from the standpoint of achieving uniform results, it is generally desirable to remove the conversion agents, particularly where they are volatile. In some cases, the liquid conversion agents may facilitate the mixing of the colloidal disperse system with the other components of the compositions of the invention. In such cases, it is advantageous to permit the conversion agents to remain in the disperse system until it is mixed with such components. Thereafter, the conversion agents can be removed from such compositions, by conventional stripping techniques if desired.

The disperse systems are characterized by three essential components: (1) solid, metal-containing particles formed in situ, (2) an inert, non-polar, organic liquid which functions as the disperse medium, and (3) an organic compound which is soluble in the disperse medium and the molecules of which are characterized by a hydrophobic portion and at least one polar substituent. In a preferred system component (1) comprises solid calcium carbonate colloidal particles having a unit particle size in the range of about 50 A to about 300 A; component (2) is a diluent comprising a food grade mineral spirits, mineral oil or an aromatic solvent. Preferred is the food grade mineral spirits; and component (3) is represented by the structure

RCOOM wherein R is a hydrocarbyl group containing from about 8 to about 24 carbon atoms, preferably from about 12 to about 22 carbon atoms. The molar ratio of (1) to (3) preferably ranges up to about 12.

Component (3) possess the same chemical composition as would the reaction products of the metal base (B) and the triglyceride (A) used in preparing the saponified intermediate. Thus, the actual chemical identity of component (3) formed in situ depends upon both the particular metal base or bases employed and the particular triglyceride material or materials reacted therewith. For example, if the metal base used in preparing the saponified intermediate were calcium hydroxide and if the triglyceride were a mixture of oleic and palmitic acids, the metal-containing particles formed in situ would be calcium oleates and calcium palmitates.

However, the physical characteristics of the particles formed in situ in the conversion step are quite different from the physical characteristics of any particles present in the homogeneous, single-phase overbased (D) which is subject to the conversion. Particularly, such physical characteristics as particle size and structure are quite different. The solid, metal-containing particles of the colloidal disperse systems are of a size sufficient for detection by X-ray diffraction. The overbased material (D) prior to conversion are not characterized by the presence of these detectable particles.

As these solid metal-containing particles formed in situ come into existence, they do so as pre-wet, pre-dispersed solid particles which are inherently uniformly distributed throughout the other components of the disperse system. The liquid disperse medium containing these pre-wet dispersed particles is readily incorporated into the compositions of the invention thus facilitating the uniform distribution of the particles throughout such compositions. This pre-wet, pre-dispersed character of the solid metal-containing particles resulting from their in situ formation is, thus, an important feature of the disperse systems.

In the foregoing preferred system, the third component of the disperse system (e.g., an organic compound which is soluble in the disperse medium and which is characterized by molecules having a hydrophobic portion and a polar substituent) is a metal carboxylate of the structure

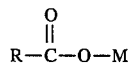

wherein R is a hydrocarbyl group, preferably an aliphatic group containing from about 8 to about 24 carbon atoms, and more preferably from about 12 to about 22 carbon atoms and M is an alkali metal or alkaline earth metal. In this case, the hydrophobic portion of the molecule is the hydrocarbon moiety, i.e., the R group. The polar substituent is the metal salt moiety,

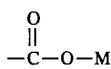

The hydrophobic portion of the organic compound is generally a hydrocarbyl group or a substantially hydrocarbyl group containing at least about 8 aliphatic carbon atoms. Usually the hydrocarbon portion is an aliphatic group. The hydrophobic portion of the organic compound is the residue of the organic material which is overbased minus its polar substituents. For example, the material to be overbased is a carboxylic acid and the hydrophobic portion is the residue of these acids which would result from the removal of the acid function. It is the hydrophobic portion of the molecule which renders the organic compound soluble in the solvent used in the overbasing process and later in the disperse medium.

The identity of the third essential component of the disperse system depends upon the identity of the starting material (i.e., the material to be overbased and the metal base (B)) used in preparing the overbased material. Once the identity of these starting materials is known, the identity of the third component in the colloidal disperse system is automatically established. Thus, from the identity of the original material, the identity of the hydrophobic portion of the third component in the disperse system is readily established as being the residue of that material minus the polar substituents attached thereto. The identity of the polar substituents of the third component is established as a matter of chemistry. If the polar groups on the material to be overbased undergo reaction with the metal base (B), the polar substituent in the final product will correspond to the reaction product of the original substituent and the metal base.

In the preparation of the gelled composition of this invention, it is essential that the basicity of the non-Newtonian colloidal disperse system be sufficiently low to provide acceptable shelf life in a coating composition which contains acidic sites. The basicity of the disperse system is determined by the neutralization base number. The neutralization base number of the final disperse system is about 50 or less, preferably about 20 or less when referenced against a phenolphthalein indicator. A particularly preferred disperse system will be that having a neutralization base number of about zero.

The following example illustrates the preparation of a non-Newtonian colloidal disperse system.

EXAMPLE 9

Charged to a 1.5 gallon, double blade stainless steel mixer are 1250 parts of the material of Example 8 and 2950 parts of Iso-Par G. The contents are heated to 55° C. while mixing at moderated speed. Charged are 1200 parts isopropyl alcohol and 600 parts water. The neutralization number is 1.0. The temperature is increased up to 65°–70° C., slightly below the reflux temperature. Mixing is continued at this temperature until complete gelation occurs-about 25 hours. The neutralization number is about zero at this point. The isopropyl alcohol-water mixture is stripped with nitrogen blowing at 3 cubic feet per hour while the temperature is slowly raised to a maximum of 120° C. When water is no longer observed coming off, the contents are stripped at 115° C. and 110 millimeters of mercury. Analyses: % $CaSO_4$ ash 12.3 and total base number 98.

EXAMPLE 10

Charged to a 1.5 gallon, double blade stainless steel mixer are 1366 parts of the material of Example 8. The contents are heated and stirred to 3520 – 38° C. and 1432 parts Iso-Par G is added followed by 31 parts (0.84 equivalents) calcium hydroxide and 738 parts isopropyl alcohol. The neutralization number is 15. The temperature is increased to 60°–63° C. and 369 parts water is added and then the temperature is increased to 68°–71 ° C. Mixing is continued at this temperature until 95% gellation occurs (about 13 hours). At this point the neutralization number is about zero. Added to the mixer is 1295 parts Iso-Par G and the contents are stripped to 121°–126° C. to remove isopropyl alcohol and water while blowing with nitrogen at 5 cubic feet per hour. Analyses % $CaSO_4$ z ash 15.9 and total base number 128.

The normal processing of PVC requires the use of heat stabilizers. These stabilizers are generally added to PVC as barium, cadmium, calcium and/or zinc salts in mineral oil. The desire to use PVC in food applications, however, requires the use of FDA compliant substrates to prepare additives that will come in contact with food. The metal overbased composition (D), most preferably a calcium overbased composition, of the present invention has been found to be a useful heat stabilizer in PVC, especially as an additive in PVC that comes in contact with food.

The metal overbased composition (D) when used as a heat stabilizer in PVC processing is present at from about 0.1% weight up to about 4% weight active chemical (the composition less any diluent oil or solvent), preferably from about 0.2% up to about 3% and most preferably from about 0.2% up to about 2%.

The non-Newtonian colloidal dispersed system provides unique rheology characteristics by giving improved thixotropy in systems such as oil, styrene, epoxy resins, amine containing systems, paints, inks, greases, etc. where conventional gelled overbased sulfonates may be ineffective or perform poorly. The non-Newtonian systems of this invention provide thixotropes which can be free of toxic components and can produce products which are in compliance with FDA regulations, that is, safe for the environment. Further, these non-Newtonian systems provide unique frictional and load bearing properties.

When utilizing the non-Newtonian disperse system of this invention, from about 0.05% weight up to about 25% weight active chemical is employed, preferably from about 0.25% up to about 10% and most preferably from about 0.5% up to about 4%.

While the invention has been explained in relation to its preferred an embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A heat stabilized PVC composition comprising PVC and a metal overbased composition, wherein the metal overbased composition is prepared by reacting;

(A) at least one vegetable oil comprising a triglyceride of the formula

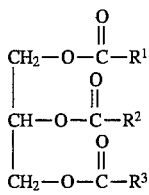

wherein $R^1$, $R^2$ and $R^3$ are independently saturated or unsaturated aliphatic hydrocarbyl groups containing from about 8 to about 24 carbon atoms with (B) a metal base oxide (MO), hydroxide (MOH) or alkoxide ($R^4$OM) wherein the metal comprises an alkali or alkaline earth and $R^4$ is a hydrocarbyl group containing from about 1 to about 24 carbon atoms, and wherein the equivalent ratio of (A):(B) is from 1.33–10:1 to form a saponified intermediate, adding 2–11 equivalents of (B) per equivalent of formed saponified intermediate and reacting excess (B) with (C) an acidic gas comprising carbon dioxide, sulfur dioxide or sulfur trioxide.

2. The composition of claim 1 wherein the vegetable oil comprises soybean oil, rapeseed oil, sunflower oil, high oleic sunflower oil, coconut oil, castor oil, lesquerella oil, or vernonia oil.

3. The composition of claim 1 wherein $R^1$, $R^2$ and $R^3$ independently contain from about 12 to about 22 carbon atoms.

4. The composition of claim 2 wherein the vegetable oil is soybean oil or coconut oil.

5. The composition of claim 1 wherein the equivalent ratio of (A):(B) to form the saponified intermediate is from 1.33–2:1.

6. The composition of claim 5 wherein the equivalent ratio of (A):(B) to form the saponified intermediate is 1.33:1.

7. The composition of claim 1 wherein the alkali metal comprises lithium, sodium or potassium.

8. The composition of claim 5 wherein the alkali metal is sodium.

9. The composition of claim 1 wherein the alkaline earth metal comprises calcium or barium.

10. The composition of claim 9 wherein the alkaline earth metal is calcium.

11. The composition of claim 1 wherein (B) is calcium hydroxide.

12. The composition of claim 1 wherein the acidic gas is carbon dioxide.

13. The composition of claim 1 wherein the additional equivalents of (B):saponified intermediate is from about 2–8:1.

14. The composition of claim 13 wherein the additional equivalents of (B):saponified intermediate is from about 3–7:1.

15. The composition of claim 1 wherein additional (A) is added after the saponified intermediate is formed and/or after the acidic gas is reacted with excess (B).

16. The composition of claim 1 wherein (A) is soybean oil, (B) is calcium hydroxide, the ratio of (A):(B) to form the saponified intermediate is 1.33:1, the additional equivalents of (B):saponified intermediate is from 3–7:1 and (C) is carbon dioxide.

* * * * *